(12) United States Patent
Hook

(10) Patent No.: US 7,633,935 B2
(45) Date of Patent: Dec. 15, 2009

(54) DYNAMIC PORT UPDATING

(75) Inventor: Joseph A. Hook, Baden, PA (US)

(73) Assignee: Ericsson AB, Stockholm (SE)

( * ) Notice: Subject to any disclaimer, the term of this patent is extended or adjusted under 35 U.S.C. 154(b) by 766 days.

(21) Appl. No.: 10/447,928

(22) Filed: May 29, 2003

(65) Prior Publication Data

US 2004/0240461 A1 Dec. 2, 2004

(51) Int. Cl.
*H04L 12/56* (2006.01)
(52) U.S. Cl. .................. 370/360; 370/391; 370/468
(58) Field of Classification Search .......... 370/389, 370/391, 392, 419, 431; 709/219
See application file for complete search history.

(56) References Cited

U.S. PATENT DOCUMENTS

| | | | |
|---|---|---|---|
| 5,748,629 A * | 5/1998 | Caldara et al. ............ 370/389 |
| 6,539,025 B1 | 3/2003 | Colsman et al. |
| 6,647,010 B1 * | 11/2003 | Ford et al. ................ 370/391 |
| 2003/0026287 A1 | 2/2003 | Mullendore et al. |
| 2003/0076849 A1 | 4/2003 | Morgan et al. |

\* cited by examiner

*Primary Examiner*—Seema S. Rao
*Assistant Examiner*—Henry Baron
(74) *Attorney, Agent, or Firm*—Ansel M. Schwartz

(57) ABSTRACT

An apparatus and method for dynamic port updating that shares a resource which includes a configurable number of groups where each group has a configurable resource share size and a controller which chooses which group are active and the share size of the resource each active group is to have. The controller modifies which groups are active and the share size of the resource of each active group during operation of the apparatus without affecting or stopping the operation of the apparatus. The method includes the steps of the controller choosing which groups are active and a share size of the resource each active group is to have. There is the step of modifying with the controller which groups are active and the share size of the resource of each active group during operation of the apparatus without effecting or stopping the operation of the apparatus.

4 Claims, 3 Drawing Sheets

TRADITIONAL PORT STRUCTURE

| MODE 1 | MODE 2 | MODE 3 | MODE 4 | MODE 5 |
|---|---|---|---|---|
| PORT 0 – OC48 (1/4) | PORT 0 – OC48 (1/4) | PORT 0 – OC48 (1/4) | PORT 0 – OC48 (1/4) | PORT 0 – OC12 (1/16) |
| PORT 1 – OC48 (1/4) | PORT 1 – OC48 (1/4) | PORT 1 – OC48 (1/4) | PORT 1 – OC12 (1/16) | PORT 1 – OC12 (1/16) |
| PORT 2 – OC48 (1/4) | PORT 2 – OC48 (1/4) | PORT 2 – OC12 (1/16) | PORT 2 – OC12 (1/16) | PORT 2 – OC12 (1/16) |
| PORT 3 – OC48 (1/4) | PORT 3 – OC12 (1/16) | PORT 3 – OC12 (1/16) | PORT 3 – OC12 (1/16) | PORT 3 – OC12 (1/16) |
| | PORT 4 – OC12 (1/16) | PORT 4 – OC12 (1/16) | PORT 4 – OC12 (1/16) | PORT 4 – OC12 (1/16) |
| | PORT 5 – OC12 (1/16) | PORT 5 – OC12 (1/16) | PORT 5 – OC12 (1/16) | PORT 5 – OC12 (1/16) |
| | PORT 6 – OC12 (1/16) | PORT 6 – OC12 (1/16) | PORT 6 – OC12 (1/16) | PORT 6 – OC12 (1/16) |
| | | PORT 7 – OC12 (1/16) | PORT 7 – OC12 (1/16) | PORT 7 – OC12 (1/16) |
| | | PORT 8 – OC12 (1/16) | PORT 8 – OC12 (1/16) | PORT 8 – OC12 (1/16) |
| | | PORT 9 – OC12 (1/16) | PORT 9 – OC12 (1/16) | PORT 9 – OC12 (1/16) |
| | | | PORT 10 – OC12 (1/16) | PORT 10 – OC12 (1/16) |
| | | | PORT 11 – OC12 (1/16) | PORT 11 – OC12 (1/16) |
| | | | PORT 12 – OC12 (1/16) | PORT 12 – OC12 (1/16) |
| | | | | PORT 13 – OC12 (1/16) |
| | | | | PORT 14 – OC12 (1/16) |
| | | | | PORT 15 – OC12 (1/16) |

*FIG. 4*
*PRIOR ART*

DYNAMIC PORT UPDATING

FIELD OF THE INVENTION

The present invention is related to sharing a resource among a plurality of configurable groups. More specifically, the present invention is related to dynamic port updating where each port of a plurality of ports has a service, and the service of each port can be modified during operation without effecting the operation.

BACKGROUND OF THE INVENTION

A scheduling ASIC for switching in a telecommunications network must be able to flexibly support a large number of port configurations that can be switched during operation. In the past, a small, fixed set of port configurations was supported. Any application that did not fall into that set was not supported.

The dynamic port updating described herein provides support for any number of ports with any mixture of speeds while providing a means of changing the configuration of added/dropped ports without impacting active ports. It addresses handling unforeseen applications as well as eliminating the need for large lists of modes to support a large variety of configurations.

SUMMARY OF THE INVENTION

The present invention pertains to an apparatus for sharing a resource. The apparatus comprises a plurality of a configurable number of groups, each group of the plurality of groups having a configurable share size of the resource. The apparatus comprises a controller which chooses which group of the plurality of group are active and the share size of the resource each active group is to have. The controller modifying which groups are active and the share size of the resource of each active group during operation of the apparatus without affecting or stopping the operation of the apparatus.

The present invention pertains to a method for sharing a resource. The method comprises the steps of choosing with a controller of an apparatus which groups of a plurality of groups of the apparatus are active and a share size of the resource each active group is to have. There is the step of modifying with the controller which groups are active and the share size of the resource of each active group during operation of the apparatus without effecting or stopping the operation of the apparatus.

The present invention pertains to an apparatus for dynamic port updating. The apparatus comprises a plurality of ports, each port of the plurality of ports having a service. The apparatus comprises a controller which chooses which ports of the plurality of ports are active and the service each active port is to have. The controller modifying which ports are active and the service of each active port during operation of the apparatus without affecting or stopping the operation of the apparatus.

The present invention pertains to a method for dynamic port updating. The method comprises the steps choosing with a controller which ports of a plurality of ports are active and a service each active port is to have. There is the step of modifying with the controller which ports are active and the service of each active port during operation of the node without effecting or stopping the operation of the node.

BRIEF DESCRIPTION OF THE DRAWINGS

In the accompanying drawings, the preferred embodiment of the invention and preferred methods of practicing the invention are illustrated in which:

FIG. 4 shows the prior art technique.

DETAILED DESCRIPTION

Figure 1:
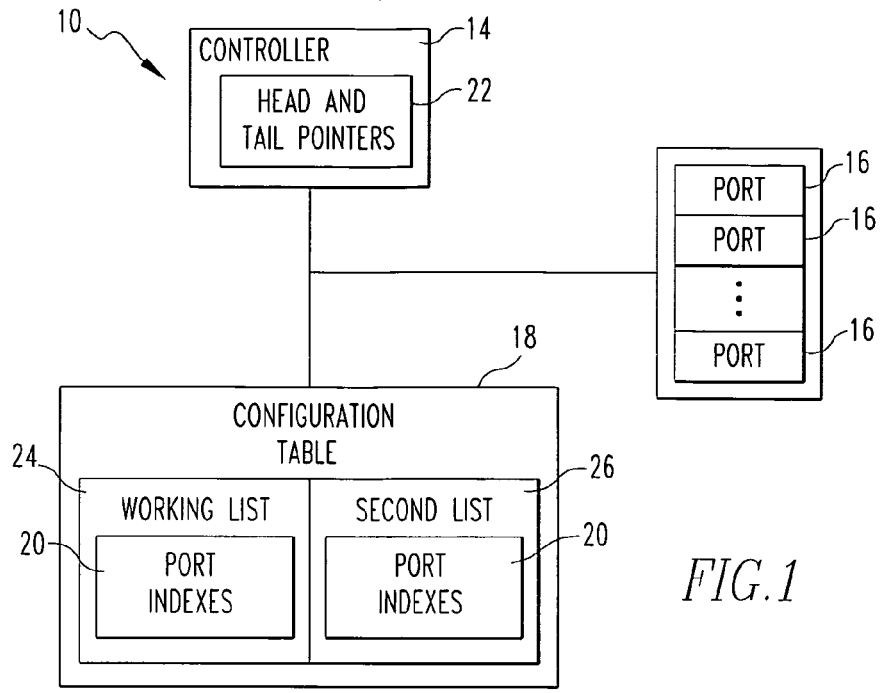
FIG. 1 is a schematic representation of an apparatus for sharing a resource of the present invention.
Figure 2:
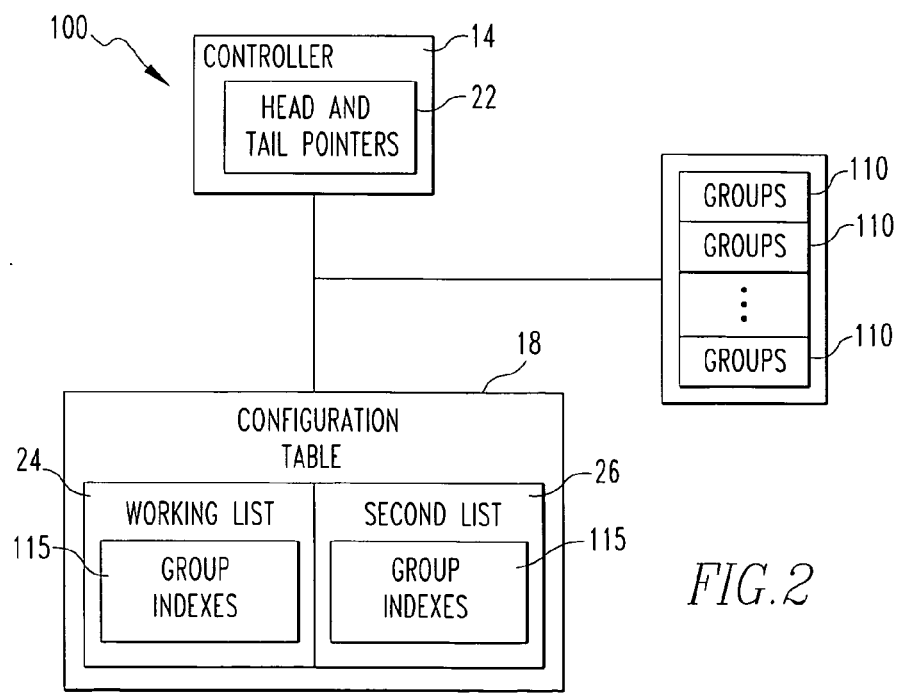
FIG. 2 is a schematic representation of an apparatus for dynamic port updating of the present invention.

Referring now to the drawings wherein like reference numerals refer to similar or identical parts throughout the several views, and more specifically to FIG. 2 thereof, there is shown an apparatus 100 for sharing a resource. The apparatus 100 comprises a plurality of a configurable number of groups 110. Each group 110 of the plurality of groups 110 having a configurable share size of the resource. The apparatus 100 comprises a controller 14 which chooses which group 110 of the plurality of group 110 are active and the share size of the resource each active group 110 is to have. The controller 14 modifying which groups 110 are active and the share size of the resource of each active group 110 during operation of the apparatus 100 without affecting or stopping the operation of the apparatus 100.

Preferably, the apparatus 100 includes a configuration table 18 having a working list 24 of group indexes 115 for the active group 110 along with their portion of the shared resource. The controller 14 preferably accesses the table via head and tail pointers 22 that are modified during operation. Preferably, the controller 14 creates a second list 26 of group indexes 115 when the working list 24 is to be modified while maintaining the working list 24, and modifies the head and tail pointers 22 to point to the second list 26 after it is created to make the second list 26 become the working list 24. Preferably, the groups 110 are ports 16, and the shared resource is preferably bandwidth.

The present invention pertains to an apparatus 10 for dynamic port updating. The apparatus 10 comprises a plurality of ports 16. Each port of the plurality of ports 16 having a service. The apparatus 10 comprises a controller 14 which chooses which ports 16 of the plurality of ports 16 are active and the service each active port is to have. The controller 14 modifying which ports 16 are active and the service of each active port during operation of the apparatus 10 without affecting or stopping the operation of the apparatus 10.

Preferably, the apparatus 10 includes a configuration table 18 having a working list 24 of port indexes 20 for the active ports 16 along with their relative speeds. The controller 14 preferably accesses the table via head and tail pointers 22 that are modified during operation. Preferably, the controller 14 creates a second list 26 of port indexes 20 when the working list 24 is to be modified while maintaining the working list 24, and modifies the head and tail pointers 22 to point to the second list 26 after it is created to make the second list 26 become the working list 24.

The present invention pertains to a method for sharing a resource. The method comprises the steps of choosing with a controller 14 of an apparatus which groups 110 of a plurality of groups 110 of the apparatus 100 are active and a share size of the resource each active group 110 is to have. There is the step of modifying with the controller 14 which groups 110 are active and the share size of the resource of each active group 110 during operation of the apparatus 100 without effecting or stopping the operation of the apparatus 100.

Preferably, there is the step of forming a configuration table 18 having a working list 24 of group indexes 115 for the active groups 110 along with their portion of the shared resource. There is preferably the step of accessing the table via head and tail pointers 22. Preferably, there is the step of creating a second list 26 of group indexes 115 when the working list 24 is to be modified while maintaining the working list 24, and modifying the head and tail pointers 22 to point to the second list 26 after it is created to make the second list 26 become the working list 24. Preferably, the groups 110 are ports 16, and the shared resource is preferably bandwidth.

The present invention pertains to a method for dynamic port updating. The method comprises the steps choosing with a controller 14 which ports 16 of a plurality of ports 16 are active and a service each active port is to have. There is the step of modifying with the controller 14 which ports 16 are active and the service of each active port during operation of the apparatus 10 without effecting or stopping the operation of the apparatus 10.

Preferably, there is the step of forming a configuration table 18 having a working list 24 of port indexes 20 for the active ports 16 along with their relative speeds. There is preferably the step of accessing the table via head and tail pointers 22. Preferably, there is the step of creating a second list 26 of port indexes 20 when the working list 24 is to be modified while maintaining the working list 24, and modifying the head and tail pointers 22 to point to the second list 26 after it is created to make the second list 26 become the working list 24.

In the operation of the invention, dynamic port updating uses a configurable table to control active ports 16 and determine their speeds. It contains a list of port indexes 20 along with their relative speeds. The table is accessed via head and tail pointers 22 that can be modified during operation. The table is large enough that a second list 26 can be created without effecting the working list 24. Once the second list 26 is created, the pointers are modified to make it the working list 24.

Figure 3:
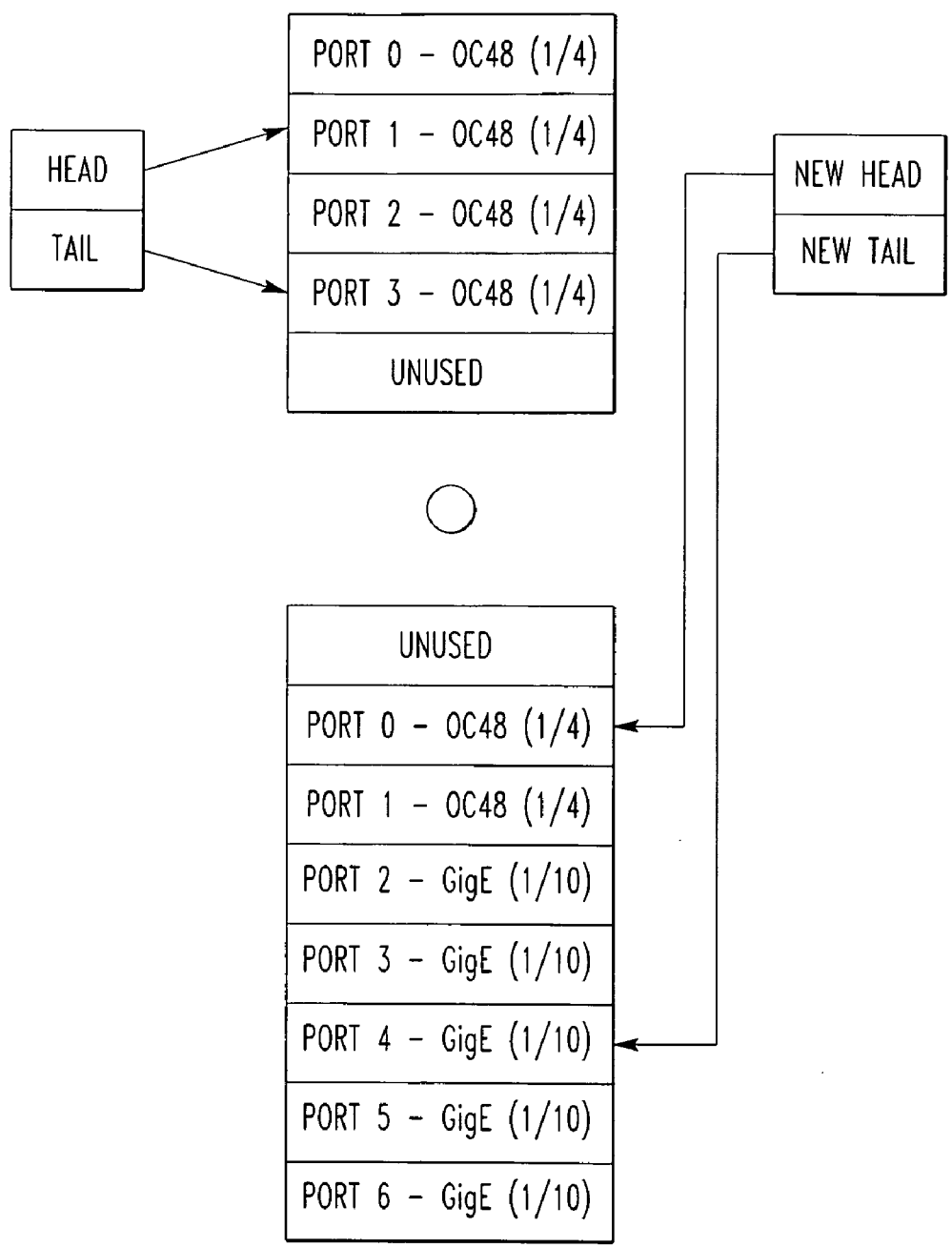
FIG. 3 shows a port time update list structure.

FIG. 3 shows the basic structure of the list along with an example showing a switch from an application for 4 OC48 ports 16 to one for 2 OC48 ports 16 and 5 GigE ports 16. FIG. 4 shows the technique that has been used in the past: a series of modes hard-coded into the design to accommodate the anticipated applications. The traditional method could not support a new application such as 10 ports 16 of GigE. As the number of supported ports 16 and types of ports 16 grows, the number of required modes grows very quickly. The single table above can support any number of ports 16 in any combination of modes with only a change in software programming. An added feature for dynamic port updating is the ease with which the configuration can be changed during chip operation. Ports 0 and 1 remain unaffected in the example above.

The end usage of the application is a single network application module that supports many physical network connection types which could be swapped while the module was installed in a network. For example, the two different configurations in FIG. 3 could be built by connecting different network connection cards into a single card which contains the controller. This provides a cost and logistic saving by being able to mass produce a single controller card instead of creating and producing a different controller card for each type of network connection. The memory that stores the configuration information will be inside the same ASIC as the controller.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for dynamic port updating for sharing a resource comprising:
   an application specific integrated circuit (ASIC) having:
   a plurality of ports, each port of the plurality of ports having a configurable share size of the resource;
   a configuration table having a working list of port indexes for the active ports along with their portion of the shared resource; and
   a controller for choosing which ports of the plurality of ports are active and the share size of the resource each active port is to have, the controller for modifying which ports are active and the share size of the resource of each active port during operation of the apparatus without affecting or stopping the operation of the apparatus, the controller arranged to access the table via head and tail pointers that are modified during operation, and the controller being further arranged to create a second list of port indexes when the working list is to be modified while maintaining the working list, and to modify the head and tail pointers to point to the second list after it is created to make the second list become the working list.

2. A method for dynamic port updating for sharing a resource comprising the steps:
   choosing with a controller of an application specific integrated circuit (ASIC) which ports of a plurality of ports are active and a share size of the resource each active port is to have;
   forming a configuration table of the ASIC having a working list of port indexes for the active ports along with their portion of the shared resource, wherein the controller accesses the table via head and tail pointers;
   and modifying with the controller of the ASIC which ports are active and the share size of the resource of each active port during operation of the apparatus without affecting or stopping the operation of the apparatus, by creating a second list of port indexes when the working list is to be modified while maintaining the working list, and modifying the head and tail pointers to point to the second list after it is created to make the second list become the working list.

3. An apparatus as described in claim 1 wherein the resource is speed or bandwidth.

4. A method as described in claim 2 wherein the resource is speed or bandwidth.

* * * * *